US012581098B2

(12) United States Patent　　　　　(10) Patent No.:　US 12,581,098 B2
Bouazizi et al.　　　　　　　　　　　　(45) **Date of Patent:　*Mar. 17, 2026**

(54) TRANSPORTING HEIF-FORMATTED IMAGES OVER REAL-TIME TRANSPORT PROTOCOL

(71) Applicant: QUALCOMM Incorporated, San Diego, CA (US)

(72) Inventors: Imed Bouazizi, Frisco, TX (US); Nikolai Konrad Leung, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,554

(22) Filed: Nov. 17, 2023

(65) Prior Publication Data

US 2024/0163461 A1　　May 16, 2024

Related U.S. Application Data

(63) Continuation of application No. 17/656,159, filed on Mar. 23, 2022, now Pat. No. 11,863,767.

(Continued)

(51) Int. Cl.
H04N 7/12　　　　(2006.01)
H04L 65/60　　　　(2022.01)
(Continued)

(52) U.S. Cl.
CPC ............. H04N 19/23 (2014.11); H04L 65/60 (2013.01); H04L 65/65 (2022.05); H04L 65/70 (2022.05); H04N 19/172 (2014.11)

(58) Field of Classification Search
CPC .. H04N 19/23; H04N 19/172; H04N 21/2353; H04N 21/236; H04N 21/4316;
(Continued)

(56) References Cited

U.S. PATENT DOCUMENTS 11,094,130 B2　　8/2021　Curcio et al.
11,587,200 B2 *　2/2023　Mate ................ H04N 21/43072
(Continued)

FOREIGN PATENT DOCUMENTS

CN　　112514398 A　　3/2021
EP　　　3304904 A1　　4/2018
WO　2020065129 A1　　4/2020

OTHER PUBLICATIONS

Qualcomm Inc: "Carriage of HEIF Images in ITT4RT", Tdoc S4-210538, TSG SA4#113-e meeting, No. Online Meeting, Apr. 6-Apr. 14, 2021, pp. 1-7.

(Continued)

*Primary Examiner* — Gims S Philippe
(74) *Attorney, Agent, or Firm* — Shumaker & Sieffert, P.A.

(57) ABSTRACT

An example device for retrieving media data, the device comprising: a memory configured to store scene data and image data; and one or more processors implemented in circuitry and configured to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

23 Claims, 6 Drawing Sheets

Related U.S. Application Data

(60) Provisional application No. 63/168,157, filed on Mar. 30, 2021.

(51) Int. Cl.

| | |
|---|---|
| *H04L 65/65* | (2022.01) |
| *H04L 65/70* | (2022.01) |
| *H04N 19/172* | (2014.01) |
| *H04N 19/23* | (2014.01) |

(58) Field of Classification Search

CPC ..... H04N 21/4331; H04L 65/60; H04L 65/65; H04L 65/70

See application file for complete search history.

(56) References Cited

U.S. PATENT DOCUMENTS

| | | | |
|---|---|---|---|
| 2009/0214078 A1 | 8/2009 | Kuo | |
| 2014/0359656 A1 | 12/2014 | Banica et al. | |
| 2015/0103927 A1 | 4/2015 | Hannuksela | |
| 2015/0242983 A1* | 8/2015 | DiGiovanni ..... | H04N 21/43074 382/100 |
| 2019/0294825 A1 | 9/2019 | Frederick | |
| 2019/0379876 A1 | 12/2019 | Hur et al. | |
| 2020/0221063 A1 | 7/2020 | Kammachi Sreedhar et al. | |
| 2020/0250891 A1* | 8/2020 | Curcio ............ | H04N 21/85406 |
| 2021/0201855 A1* | 7/2021 | Kammachi-Sreedhar ................... | H04N 13/183 |
| 2021/0350634 A1 | 11/2021 | Major et al. | |
| 2022/0221063 A1* | 7/2022 | Meyer ................ | F16K 27/0263 |
| 2022/0321897 A1 | 10/2022 | Bouazizi et al. | |

OTHER PUBLICATIONS

3GPP TR 26.862: "3rd Generation Partnership Project, Technical Specification Group Services and System Aspects Immersive Teleconferencing and Telepresence for Remote Terminals(ITT4RT) Use Cases, Requirements and Potential Solutions (Release 17)", S4-211152, 3GPP, Mobile Competence Centre, 650, Route Des Lucioles, F-06921, Sophia-Antipolis Cedex, France, Aug. 12, 2021, XP052064379, pp. 1-62, URL: https://ftp.3gpp.org/tsg_sa/WG4_CODEC/TSGS4_115-e/Docs/S4-211152.zip TR 26.862v.0.0.2.docx.

Bouazizi I., et al., "[SD] Real-Time Media Support in Scene Description", 130. MPEG Meeting, Apr. 20-Apr. 24, 2020, ALPBACH, (Motion Picture Expert Group or ISO/IEC JTC1/SC29/WG11), No. m53366, Apr. 15, 2020, XP030286650, 4 Pages, URL: http://phenix.int-evry.fr/mpeg/doc_end_user/documents/130_Alpbach/wg11/m53366-v1-m53366.zip m53366_realtime_sd.docx.

Fielding R., et al., "Hypertext Transfer Protocol—HTTP/1.1", Network Working Group, Request for Comments, RFC 2616, Standards Track, Jun. 1999, pp. 1-114.

International Search Report and Written Opinion—PCT/US2022/071317—ISA/EPO—Jul. 18, 2022, 14 Pages.

ISO/IEC JTC 1/SC 29 N, ISO/IEC FDIS 23008-12 2nd Edition, Information Technology—MPEG Systems Technologies—Part 12, Sep. 29, 2021, 152 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Nokia Corporation: "Video Support for ITT4RT", 3GPP TSG SA WG 4 MTSI SWG Telco on ITT4RT, S4aM200638, 3GPP, Mobile Competence Centre, 650, Route Des Lucioles, F-06921, Sophia-Antipolis Cedex, France, vol. SA WG4, No. Telco, 20210301, Mar. 19, 2021, XP051989124, 46 Pages, URL: https://ftp.3gpp.org/tsg_sa/WG4_CODEC/3GPP_SA4_AHOC_MTGs/SA4_MTSI/Docs/S4aM200638. zip Draft CR 26.114 ITT4RT on viewport-dependent delivery.doc.

Paila T., et al., "FLUTE—File Delivery Over Unidirectional Transport", FLUTE—File Delivery Over Unidirectional Transport, rfc6726.txt, Internet Engineering Task Force (IETF), Standard Track, Internet Society (ISOC) 4, Rue Des Falaises CH-1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30-p. 27, line 12.

"Text of ISO/IEC FDIS 23008-12 2nd Edition", 117. MPEG Meeting, Jan. 16-Jan. 20, 2017, Geneva, (Motion Picture Expert Group or ISO/IEC JTC1/SC29/WG11), No. n16657, Mar. 27, 2017, XP030023325, 96 Pages, URL: http://phenix.int-evry.fr/mpeg/doc_end_user/documents/117_Geneva/wg11/w16657.zip 23008-12_Ed2_FDIS_clean.doc.

Wang Y.K., et al., "RTP Payload Format for High Efficiency Video Coding (HEVC)", Internet Engineering Task Force (IETF), Mar. 2016, pp. 1-86.

Nokia Corporation et al., "ITT4RT Draft CR 26.114 on Phase 2 Features", S4-211613, 3GPP TSG SA WG4 Meeting #116e Nov. 10-19, 2021, Online, 25 Pages.

Nokia Corporation (ITT4RT Rapporteur): "ITT4RT Permanent Document—Requirements, Working Assumptions and Potential Solutions", S4-211265, 3GPP TSG SA WG4 Meeting #115-e Online Meeting, Aug. 18-27, 2021, 88 Pages.

Taiwan Search Report—TW111111332—TIPO—May 9, 2025.

* cited by examiner

TRANSPORTING HEIF-FORMATTED IMAGES OVER REAL-TIME TRANSPORT PROTOCOL

This application is a continuation of U.S. patent application Ser. No. 17/656,159, filed Mar. 23, 2022, which claims the benefit of U.S. Provisional Patent Application No. 63/168,157, filed Mar. 30, 2021, the entire content of each application is incorporated herein by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After media data, such as video data, has been encoded, the media data may be packetized for transmission or storage. The media data may be assembled into a media file conforming to any of a variety of standards, such as the International Organization for Standardization (ISO) base media file format (ISOBMFF) and extensions thereof, such as AVC.

SUMMARY

In general, this disclosure describes techniques for supporting transport and presentation of images as sources for overlays. Overlays, or overlay images, generally correspond to static images that are presented over dynamic video content. That is, the static image overlay remains unchanged when presented over the dynamic video content, which may change frame-by-frame. Alternatively, a series of images may be presented as an overlay, e.g., in the form of a loop. In such cases, the overlay image sequence may repeat with a regular periodicity, e.g., according to a number of images included in the overlay image sequence. Overlays are important aspects of immersive teleconferencing, as overlays may be used to super-impose a wide variety of content in a scene. For example, overlays may allow for super-imposing slides, logos, and/or information screens into a scene. An overlay texture may be from a video stream, one or more still images, or a sequence of images. The Immersive Teleconferencing and Telepresence for Remote Terminals (ITT4RT) group is working to support images as sources for overlays. This disclosure describes usage of High Efficiency Image File (HEIF) format as a format for containing image overlays.

In one example, a method of retrieving media data includes receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receiving the one or more overlay images from the bitstream; receiving the scene data including one or more scene images; and presenting the scene images and the overlay images.

In another example, a device for retrieving media data includes a memory configured to store scene data and image data; and one or more processors implemented in circuitry and configured to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

In another example, a computer-readable storage medium having stored thereon instructions that, when executed, cause a processor to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

In another example, a device for receiving media data includes means for receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; means for receiving the one or more overlay images from the bitstream; means for receiving scene data including one or more scene images; and means for presenting the scene images and the overlay image.

The details of one or more examples are set forth in the accompanying drawings and the description below. Other features, objects, and advantages will be apparent from the description and drawings, and from the claims.

DETAILED DESCRIPTION

In general, this disclosure describes techniques for using a particular format, such as High Efficiency Image File (HEIF) format, to contain image overlays. Overlays, or overlay images, generally correspond to static images that are presented over dynamic video content or. That is, the static image overlay remains unchanged when presented over the dynamic video content, which may change frame-by-frame. Alternatively, a series of images may be presented as an overlay, e.g., in the form of a loop. In such cases, the overlay image sequence may repeat with a regular period-icity, e.g., according to a number of images included in the overlay image sequence. For example, if the overlay image sequence includes N images, the $i^{th}$ image in the image sequence will be presented every $j*N+i$ frames, where j can range from zero to infinity and i can range from zero to N−1. The HEIF format is defined in ISO/IEC 23008-12. ISO/IEC 23008-12 specifies storage of images and image sequences and their metadata into ISOBMFF-based container files. HEIF defines a generic, codec-agnostic structure for the storage of images, and also provides an instantiation based on the H.265/HEVC (High Efficiency Video Coding) codec.

In various contexts, such as video telephony and video conferencing sessions, it may be desirable to share images between participants. However, in some video streaming protocols, such as Real-time Transport Protocol (RTP), carriage of images is not defined. HEIF is an image format that allows for the storage of image collections and image sequences that are encoded using, e.g., HEVC or other video codecs. The carriage of these images over RTP is not currently specified. This disclosure describes techniques for carrying and presenting HEIF image collections and image sequences over RTP. These techniques describe extensions to RTP payload format for, e.g., HEVC, as well as signaling of images in Session Description Protocol (SDP). In this manner, images and image sequences may be transported during a video conferencing session, for which data may be transported using RTP or other such protocols.

The techniques of this disclosure may be applied to media files, such as video files, conforming to media data encap-sulated according to any of ISO base media file format (ISOBMFF), Scalable Video Coding (SVC) file format, Advanced Video Coding (AVC) file format, Third Genera-tion Partnership Project (3GPP) file format, and/or Multiv-iew Video Coding (MVC) file format, or other similar video file formats.

Figure 1:
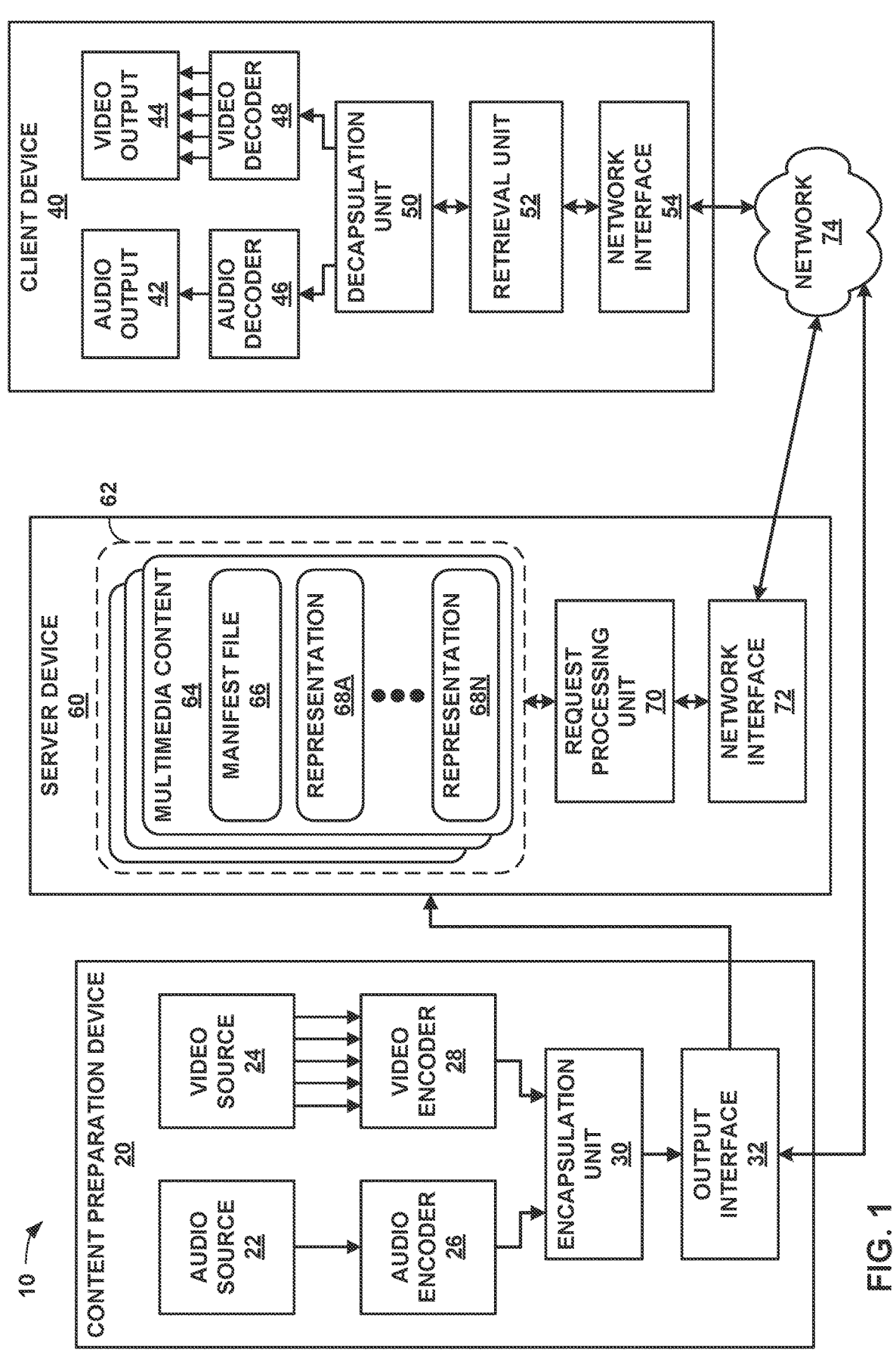
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communica-tively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previ-ously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a com-puter-readable storage medium comprising stored audio data, and video source 24 may comprise a computer-read-able storage medium comprising stored video data. In this manner, the techniques described in this disclosure may be applied to live, streaming, real-time audio and video data or to archived, pre-recorded audio and video data.

Audio frames that correspond to video frames are gener-ally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally corre-spond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same time-stamp. Content preparation device 20 may include an inter-nal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC, ITU-T H.265/High Efficiency Video Coding (HEVC), and the upcoming ITU-T H.266/Versatile Video Coding (VVC) standards, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC) Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

The example of FIG. 1 describes the use of DASH and HTTP-based streaming for purposes of example. However, it should be understood that other types of protocols may be used to transport media data. For example, request processing unit 70 and retrieval unit 52 may be configured to operate according to Real-time Transport Protocol (RTP), Real-time Streaming Protocol (RTSP), or the like, and use supporting protocols such as Session Description Protocol (SDP) or Session Initiation Protocol (SIP).

Figure 2:
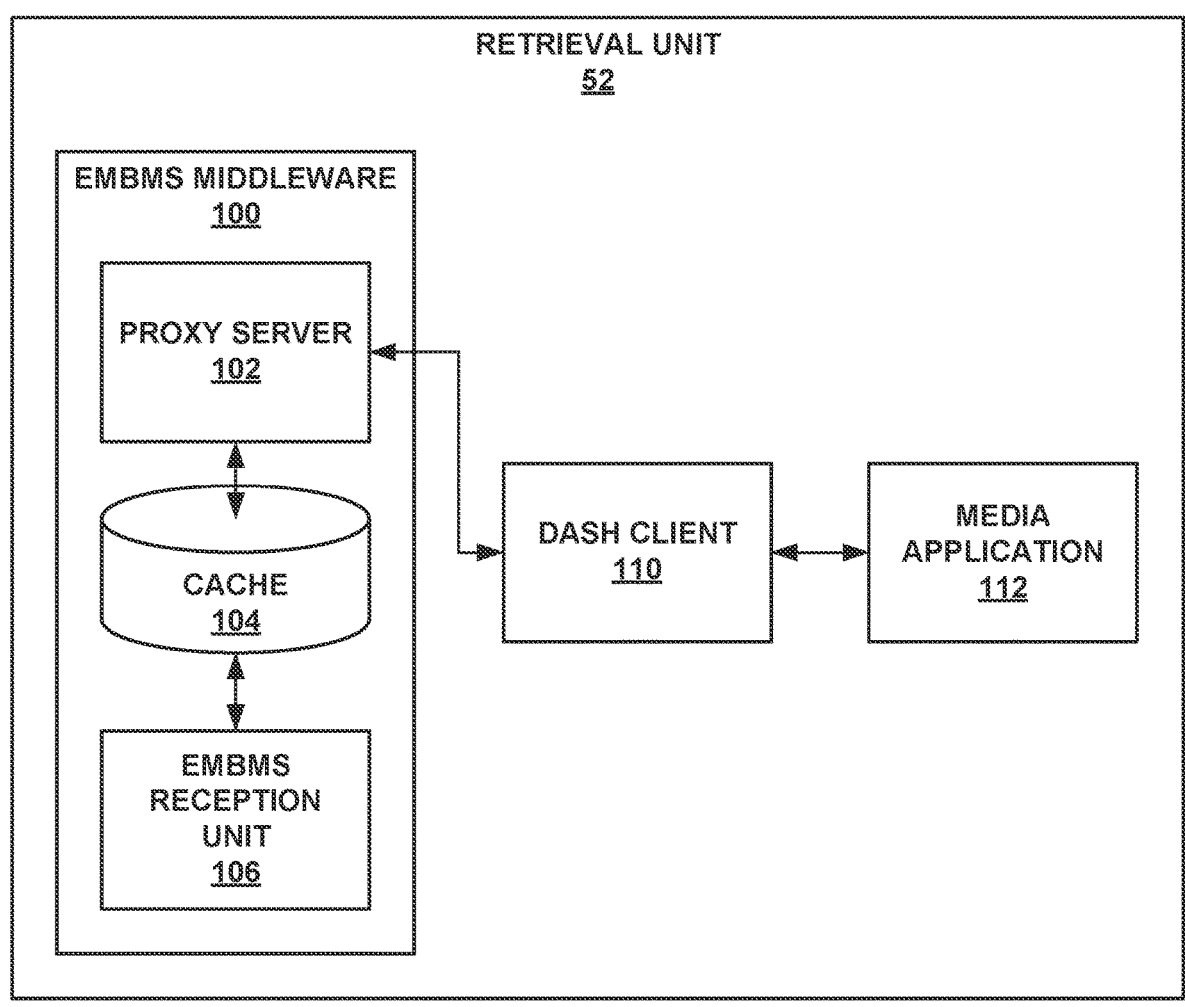
FIG. 2 is a block diagram illustrating an example set of components of retrieval unit 52 of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/repl/seg3, DASH client 110 may construct an HTTP GET request that includes a request for http://127.0.0.1/repl/seg3, and submit the request to proxy server unit 102. Proxy server unit 102 may retrieve requested data from cache 104 and provide the data to DASH client 110 in response to such requests.

Client device 40 represents an example of a device for retrieving media data, including a memory configured to store scene data and image data; and one or more processors implemented in circuitry and configured to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

Figure 3:
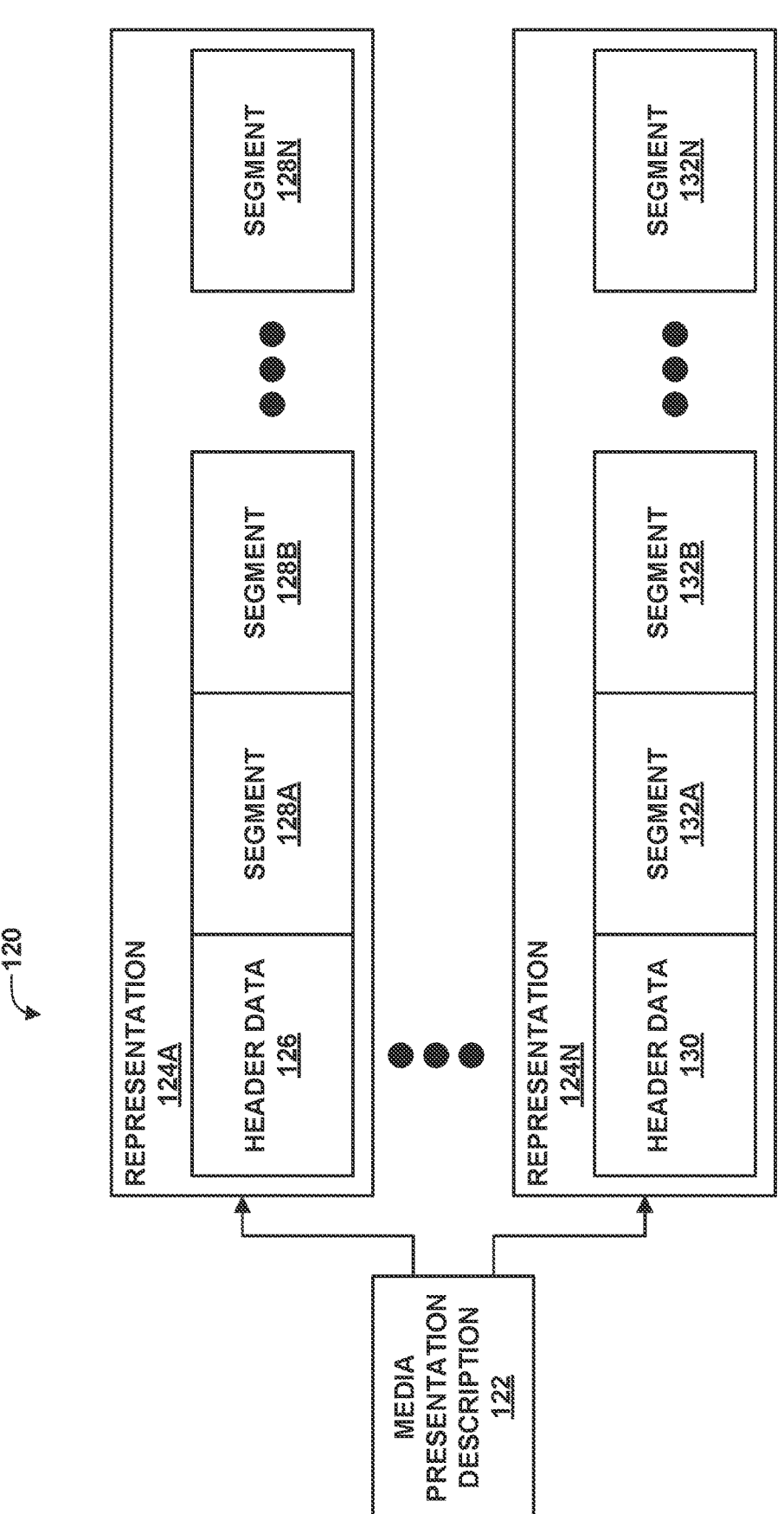
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
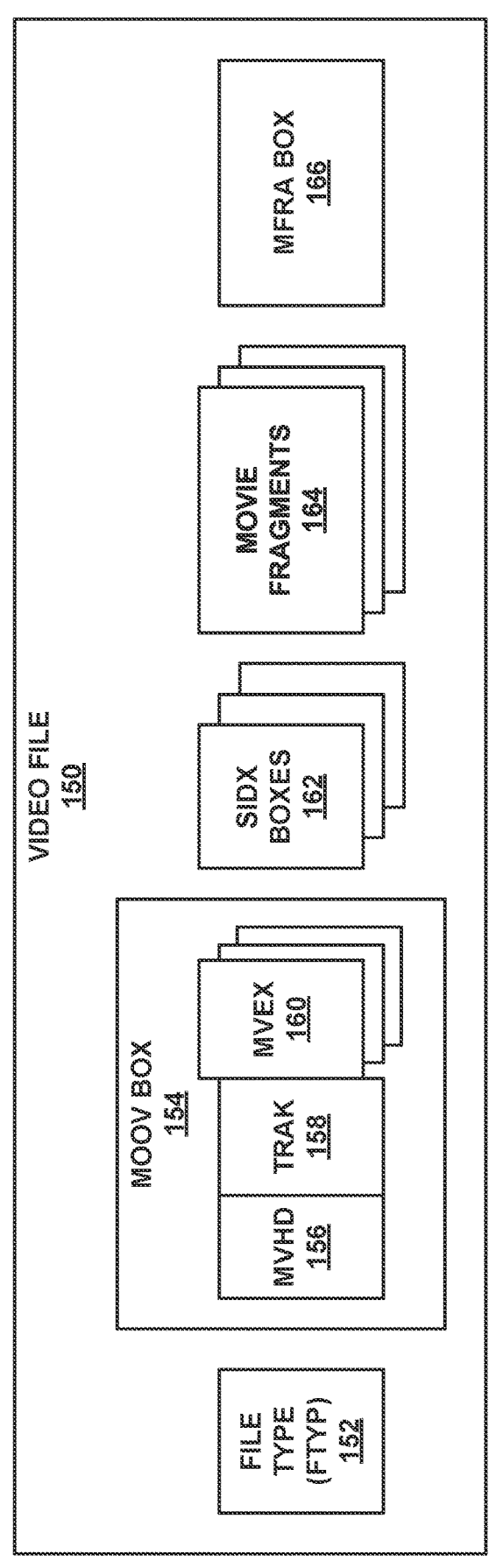
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
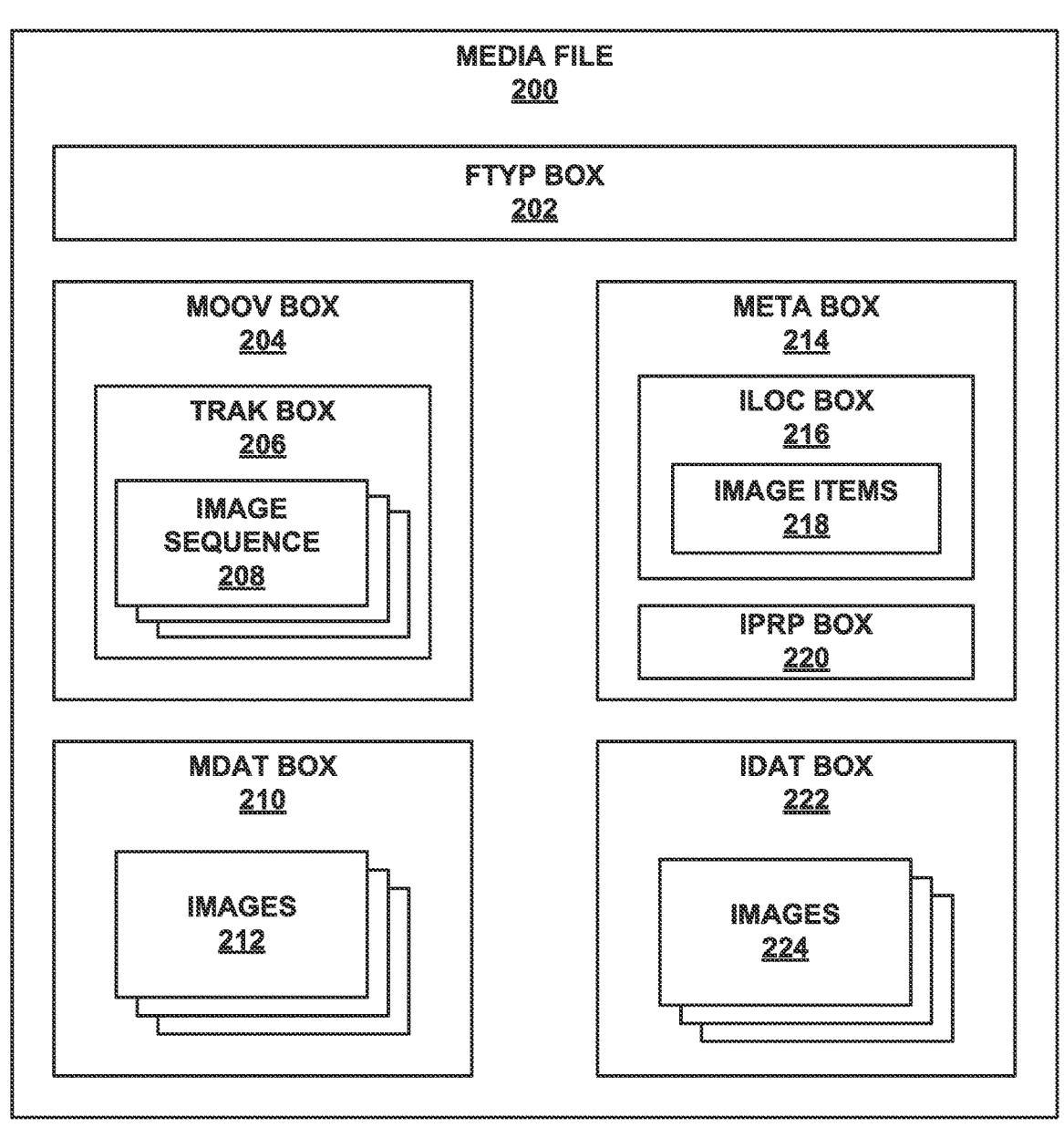
FIG. 5 is a conceptual diagram illustrating an example structure of a High Efficiency Image File (HEIF) Format for containing image data.

FIG. 5 is a conceptual diagram illustrating an example structure of a High Efficiency Image File (HEIF) Format for containing image data in media file 200. The HEIF format is defined in ISO/IEC 23008-12. HEIF specifies the storage of images and image sequences and their metadata into ISOBMFF-based container files. HEIF defines a generic codec-agnostic structure for the storage of images, but also provides an instantiation based on H.265/HEVC codec. Segments 128, 132 of FIG. 4 may conform to the HEIF format of FIG. 5, in some examples.

HEIF follows the ISOBMFF design rules for the storage of media. As such, image sequences are stored in tracks and still images are stored as metadata items. In the former, the images are coded together. Thus, the coded images will have some decoding dependencies. In the latter, the images are coded independently from each other.

As shown in FIG. 5, an HEIF formatted media file 200 includes FTYP box 202, MOOV box 204, which may include TRAK box 206 including zero or more images in image sequence 208, META box 214 including an image location (ILOC) box 216 including zero or more image items 218 and item properties (IPRP) box 220, MDAT box 210 including zero or more images 212, and item data (IDAT) box 222 including zero or more images 224.

An ISOBMFF container file that stores images with HEVC encoding may be identified by the "heic" or the "hevc" brands, correspondingly, which are found in FTYP box 202 at the beginning of the ISOBMFF box. The MIME type of these files may be set to "image/heic" for still images or "image/heic-sequence" for image sequences.

Images in a container may be assigned different roles. The following roles are examples that may be assigned to images, such as images 212, 224:

Cover image: the default image that is shown in the absence of other information on the display preference. Only one cover image may be defined in a HEIF Thumbnail image: a small resolution image corresponding to a master image Auxiliary image: an image that complements a master image, containing e.g. a depth map.

Master image: a main image in the container file that is a full resolution.

Hidden image: an image that is not intended to be displayed.

Pre-computed derived image: a coded image that has been derived from other images Coded image: a coded representation of an image Derived image: is an image that has to be derived using some operations and a reference to other images in the container file. The defined operations include: cropping, rotation, mirroring, and composition.

Image sequences may take master, auxiliary, or thumbnail image sequence roles.

Images 212, 224 may be stored with their own metadata in the container file. The initialization information may be stored in the sample entry as part the sample description box for image sequences. For still images, initialization information may be stored as part of IPRP container box 220 as item properties. This metadata may contain information such as dimensions of the image, codec initialization information, and the like.

Additional metadata, such as pixel aspect ratio, color information, and bit depth, can be present in item property container boxes and reference the actual images using the "cdsc" reference type in the item reference box.

For image sequences, such as image sequence 208, the specification defines playback control features to describe, for example, any or all of:

Images that are not to be displayed

Slideshow vs image collection

Playback timing for slideshow

Looping of the slideshow

Transformations on the images

To facilitate access to a specific image in an image sequence, sample grouping may be used to indicate the decoding dependencies of that image. The decoder does not need to decode all images 212 of image sequence 208.

The Real-time Transport Protocol (RTP) payload format for HEVC is defined in IETF RFC 7798, RTP Payload Format for High Efficiency Video Coding (HEVC). RFC 7798 is currently supported by MTSI for the transport of video streams. The payload format defines the usage of the RTP header when carrying HEVC payload, the packetization of the HEVC coded NAL units into RTP packets, the SDP description, and payload header extension mechanisms.

Both images and image sequences may be used as overlays in the context of ITT4RT. The HEIF format may be used as the source for the overlay. The transmission may be HEVC compliant, i.e., the image items and image sequences may be extracted from the HEIF source and transmitted using the HEVC payload format.

The ITT4RT-tx client may indicate the following information to the receiver:

That the stream is an image overlay stream.

Whether the stream carries image sequences or still images or both.

The number of still image items.

The number of images in an image sequence.

The transmission mode for the still images or image sequences. The transmission mode may be set to "coupled" to indicate the coupling of transmission and display, in which case the display time is always determined by the RTP timestamp. Alternatively, the transmission mode may be "decoupled" to indicate that the transmission is independent from presentation, so that the presentation timing is provided separately to support use cases such as storage and looping.

The display order of the images in a still image collection or image sequences, in case the transmission mode is set to "decoupled."

Image metadata for each of the image items or samples, including image dimensions, image role, etc.

To support this signaling, an "image" SDP attribute may be used to identify that the stream carries one or more overlay images, including still images and/or an image sequence. The "image" attribute may have the following Augmented Backus-Naur Form (ABNF) syntax:

image_attribute="a=image:" pt SP transmission mode SP item_count transmission_mode="tmode=" ("coupled"/"decoupled" [";" store] [";" loop])

item_count="count=" 1*DIGIT metadata_index="meta=" 1*DIGIT store="store=" ("0"/"1")

loop="loop=" ("0"/"1")

Semantics for the syntax elements above may be defined as follows:

pt: the payload type used for the carriage of this image collection or image sequence. In the presence of multiple image sequences or a mix of image collections and image sequences, different payload types shall be used for the different sequences or image collection.

transmission_mode: the transmission mode coupled, indicates that the overlay images will be continuously streamed (retransmitted) for as long the overlay is to be rendered. The RTP timestamp may be used to determine the presentation time of the overlay image. The images are not required to be stored and no looping need be performed. Images may be master images in this case. In case of "decoupled" transmission mode, the presentation of the images may be overwritten by the image metadata. The RTP timestamps may be used to determine the index of the images.

item_count: provides the number of images in the corresponding image collection or image sequence.

store: for the decoupled transmission mode, the store flag tells the receiver whether to store the images for continuous presentation or not. This allows the transmission session to be much shorter than the actual presentation. In particular, a still image overlay is typically stored for presentation throughout the lifetime of the overlay.

loop: for the decoupled transmission mode, the loop flag indicates if the image collection or image sequence shall be looped or whether the last image item in the collection or image sequence is to remain in display.

The carriage of the metadata for the image items in an image collection or image sequence is performed using the "image-metadata" attribute, which may be defined as follows:

image-metadata="a=image-metadata:" pt SP coded-metadata

In the example above, coded-metadata is base64 coded image metadata for the corresponding image collection or image sequence.

The image metadata may have the following format:

```
image_metadata(pt,image_count) {
    for(i=0;i<image_count;i++) {
        image_properties( )
        display_info( )
        extension_info( )
    }
}
image_properties( ) {
    ispe_present_flag                        1
    pasp_present_flag                        1
    colr_present_flag                        1
    pixi_present_flag                        1
    clap_present_flag                        1
    irot_present_flag                        1
    imir_present_flag                        1
    other_properties( )                      1
    ImageSpatialExtentsProperty( )
    PixelAspectRatioBox( )
    PixelAspectRatioBox( )
    ColourInformationBox( )
    PixelInformationProperty( )
    CleanApertureBox( )
    ImageRotation( )
    other_properties( )
}
display_info( ) {
    order                                 u(8)
    duration                              u(16)
}
```

All image properties may be formatted according to their respective definition, e.g., as defined in ISO/IEC 23008-12, MPEG systems Technologies—Part 12: Image File Format.

The display_info element may provide information on the display order of each image in the image collection or sequence. An order of 0 means the image is not to be rendered. This might be the case for auxiliary or hidden images. The duration indicates for how long the image is to be rendered in units of a 90 kHz clock.

The metadata information may be base64 encoded and provided as part of the image-metadata attribute for each image collection or image sequence independently.

The coupled transmission mode may be suitable for a live overlay stream, e.g., a live slide presentation. The decoupled transmission mode may be suitable for preset content, such as a timed slideshow.

The following table provides an example set of SDP data for carriage of image collections and image sequences:

```
        .
        .
        .
  m=video 49170 RTP/AVP 98,99
  a=rtpmap:98 H265/90000
  a=fmtp:98 profile-id=1;sprop-vps=<video parameter sets data>
  a=image:98 tmode=coupled count=14
  a=image-metadata:98 coded-metadata=<base64 coded metadata>
  a=rtpmap:99 H265/90000
  a=fmtp:99 profile-id=1;sprop-vps=<video parameter sets data>
  a=image:99 tmode=decoupled;store=1;loop=1 count=6
  a=image-metadata:99 coded-metadata=<base64 coded metadata>
        .
        .
        .
```

Figure 6:
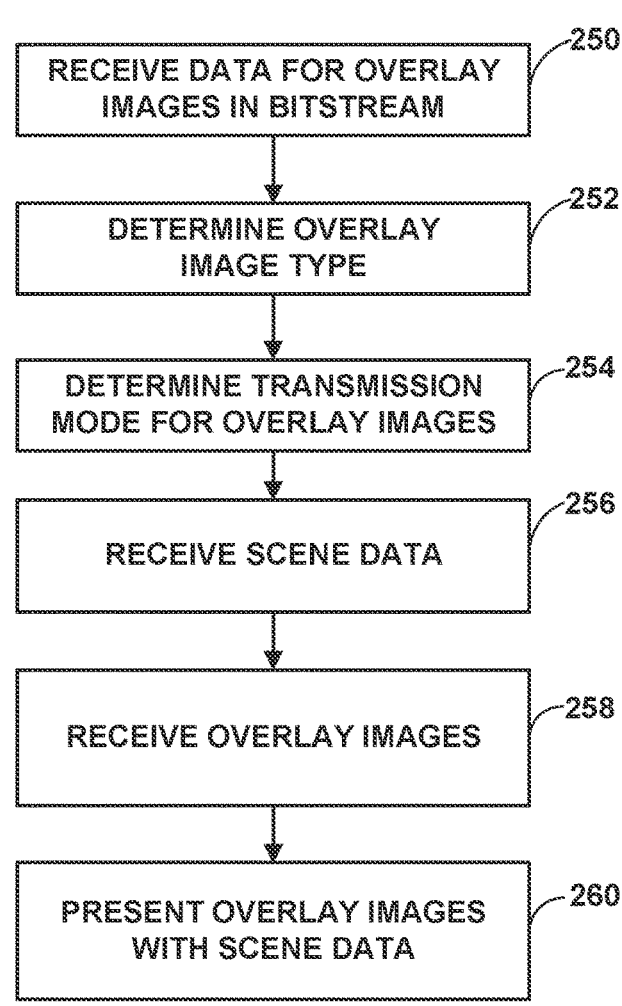
FIG. 6 is a flowchart illustrating an example method of retrieving media data according to the techniques of this disclosure.

FIG. 6 is a flowchart illustrating an example method of retrieving media data according to the techniques of this disclosure. The method of FIG. 6 is explained with respect to client device 40 and retrieval unit 52 of FIGS. 1 and 2. Other devices may be configured to perform this or a similar method.

As discussed above, a bitstream may include data indicating that the bitstream includes one or more overlay images. In particular, the overlay images may include either or both of a static image or an image sequence. The static image may be an image that is to be presented with scene data (e.g., video data, extended reality (XR) content, augmented reality (AR) content, virtual reality (VR) content, or the like) that remains constant while being presented frame-by-frame with frames of the scene data. Additionally or alternatively, the image sequence may be a sequence of images that repeats with a regular periodicity while being presented frame-by-frame with the frames of the scene data.

The overlay images may occupy a smaller region of a full viewport presentation than the scene data as a whole. That is, while the scene data may generally occupy the entirety of the viewport (i.e., the entirety of a screen, lenses, or other display device), the overlay images may occupy a relatively small portion of the viewport, and be presented over (in front of) the scene data, such that the overlay images occlude a small portion of the scene data.

The data of the bitstream may include an SDP image attribute or other data that indicates, for example, a payload type indicating whether the overlay images include a static image, an image sequence, or both. The data may also indicate a transmission mode, e.g., "coupled" or "decoupled." The transmission mode of "coupled" indicates that the overlay images are continuously transmitted in the bitstream. The transmission mode of "decoupled" indicates that the overlay images are not retransmitted. In some examples, the data may further indicate whether the overlay images are to be stored (buffered), and/or whether the overlay images are to be played in a loop.

Accordingly, retrieval unit 52 of client device 40 of FIG. 1, for example, may receive the data of the bitstream indicating that one or more overlay images are included in the bitstream (250). Retrieval unit 52 may then use this data to determine an overlay image type (252). For example, retrieval unit 52 may determine whether the overlay images include static images and/or an image sequence.

Retrieval unit 52 may also determine a transmission mode for the overlay images (254). For example, retrieval unit 52 may determine whether the overlay images are continuously retransmitted or sent once (or, e.g., on demand via unicast instead of broadcast or multicast). Thus, retrieval unit 52 may determine when and how to extract the overlay images, whether to buffer the overlay images, how to present the overlay images (e.g., over a loop or as a single presentation), or the like. Retrieval unit 52 may provide data representing extraction of the overlay images to decapsulation unit 50 and presentation of the overlay images to, e.g., video output 44.

Retrieval unit 52 may receive scene data (256) for the scene, as well as receive the overlay images themselves (258). The overlay images may be included in a media file such as media file 200 of FIG. 5. Retrieval unit 52 may buffer the overlay images in, e.g., cache 104 (FIG. 2), assuming the received data indicates that the overlay images are to be buffered.

Media application 112 (FIG. 2) of retrieval unit 52 may then present the overlay images with the scene data (260). For example, media application 112 may be configured to present scene data frame-by-frame via video output 44, while presenting the overlay images over the scene data. For example, media application 112 may be configured to present a single, static overlay image over scene data presented frame-by-frame. Alternatively, if the overlay images include an image sequence that is to be looped, media application 112 may present the overlay images in order repeatedly. That is, if the video sequence includes N images, where N is a positive integer, for loop j where j is a non-negative integer, media application 112 may present image i at time $j*N+i$. The received data may indicate presentation times for the overlay images, and media application 112 may present the overlay images at the indicated presentation times accordingly.

DASH client 110 may be configured to retrieve the overlay images either from a separate server device using unicast or from proxy server 102. In particular, if the images are to be stored locally in cache 104, DASH client 110 may retrieve the overlay images from cache 104 (i.e., a local memory) repeatedly via proxy server 102. Alternatively, media application 112 may be allocated memory in a separate storage device from cache 104, and buffer the overlay images in the allocated memory.

In this manner, the method of FIG. 6 represents an example of a method including receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receiving the one or more overlay images from the bitstream; receiving the scene data including one or more scene images; and presenting the scene images and the overlay images.

Various examples of the techniques of this disclosure are summarized in the following clauses:

Clause 1: A method of retrieving media data, the method comprising: receiving data for a bitstream indicating that the bitstream includes one or more overlay images; receiving the one or more overlay images from the bitstream; receiving scene data including one or more scene images; and presenting the scene images and the overlay images.

Clause 2: The method of clause 1, further comprising receiving data for the bitstream indicating whether the one or more overlay images include one or more image sequences and whether the one or more overlay images include one or more still images.

Clause 3: The method of clause 2, further comprising, when the data indicates that the one or more overlay images include the one or more image sequences, a number of images in each of the image sequences.

Clause 4: The method of any of clauses 2 and 3, further comprising, when the data indicates that the one or more overlay images include the one or more still images, a number of the still images.

Clause 5: The method of any of clauses 2-4, further comprising receiving data representing transmission modes for the image sequences and the still images.

Clause 6: The method of clause 5, further comprising, when one of the transmission modes is "coupled," determining display times for the overlay images from timestamp data of the bitstream.

Clause 7: The method of clause 6, wherein the timestamp data comprises Real-time Transport Protocol (RTP) timestamp data.

Clause 8: The method of any of clauses 5-7, further comprising, when one of the transmission modes is "decoupled": receiving data representing display times for the overlay images separately; and determining the display times for the overlay images from the separately received data.

Clause 9: The method of any of clauses 1-8, further comprising, when the one or more overlay images include two or more overlay images, receiving data representing a display order of the overlay images.

Clause 10: The method of any of clauses 1-9, further comprising receiving image metadata for each of the overlay images from the bitstream, the metadata indicating one or more of image dimensions or an image role.

Clause 11: The method of clause 10, wherein the image role comprises at least one of a cover image, a thumbnail image, an auxiliary image, a master image, a hidden image, a pre-computed derived image, a coded image, or a derived image.

Clause 12: The method of any of clauses 10 and 11, wherein the metadata includes one or more of an image_properties( )element, a display info( )element, or an extension_info( )element.

Clause 13: The method of clause 12, wherein the image_properties( )element includes one or more of an ispe_present_flag, a pasp_present_flag, a colr_present_flag, a pixi_present_flag, a clap_present_flag, an irot_present_flag, an imir_present_flag, an other_properties( )element, an Image SpatialExtentsProperty( )element, a PixelAspectRatioBox( )element, a ColourInformationBox( )element, a PixelInformationProperty( )element, a CleanApertureBox( )element, or an ImageRotation( )element.

Clause 14: The method of any of clauses 12 and 13, wherein the display_info( ) element includes one or more of an order element indicating an order of presentation of the overlay images or a duration element indicating an amount of time a corresponding one of the overlay images is to be displayed.

Clause 15: The method of any of clauses 1-14, further comprising receiving a session description protocol (SDP) image attribute that identifies the bitstream.

Clause 16: The method of clause 15, wherein the SDP image attribute includes one or more syntax elements including an image attribute, a transmission_mode, an item_count, a metadata_index, a store, or a loop.

Clause 17: The method of clause 1, further comprising receiving data for the bitstream indicating whether the one or more overlay images include one or more image sequences and whether the one or more overlay images include one or more still images.

Clause 18: The method of clause 17, further comprising, when the data indicates that the one or more overlay images include the one or more image sequences, a number of images in each of the image sequences.

Clause 19: The method of clause 18, further comprising, when the data indicates that the one or more overlay images include the one or more still images, a number of the still images.

Clause 20: The method of clause 18, further comprising receiving data representing transmission modes for the image sequences and the still images.

Clause 21: The method of clause 20, further comprising, when one of the transmission modes is "coupled," determining display times for the overlay images from timestamp data of the bitstream.

Clause 22: The method of clause 21, wherein the timestamp data comprises Real-time Transport Protocol (RTP) timestamp data.

Clause 23: The method of clause 20, further comprising, when one of the transmission modes is "decoupled": receiving data representing display times for the overlay images separately; and determining the display times for the overlay images from the separately received data.

Clause 24: The method of clause 1, further comprising, when the one or more overlay images include two or more overlay images, receiving data representing a display order of the overlay images.

Clause 25: The method of clause 1, further comprising receiving image metadata for each of the overlay images from the bitstream, the metadata indicating one or more of image dimensions or an image role.

Clause 26: The method of clause 25, wherein the image role comprises at least one of a cover image, a thumbnail image, an auxiliary image, a master image, a hidden image, a pre-computed derived image, a coded image, or a derived image.

Clause 27: The method of clause 26, wherein the metadata includes one or more of an image_properties( )element, a display_info( )element, or an extension_info( ) element.

Clause 28: The method of clause 27, wherein the image_properties( )element includes one or more of an ispe_present_flag, a pasp_present_flag, a colr_present_flag, a pixi_present_flag, a clap_present_flag, an irot_present_flag, an imir_present_flag, an other_properties( )element, an ImageSpatialExtentsProperty( )element, a PixelAspectRatioBox( )element, a ColourInformationBox( )element, a PixelInformationProperty( )element, a CleanApertureBox( )element, or an ImageRotation( )element.

Clause 29: The method of clause 27, wherein the display_info( )element includes one or more of an order element indicating an order of presentation of the overlay images or a duration element indicating an amount of time a corresponding one of the overlay images is to be displayed.

Clause 30: The method of clause 1, further comprising receiving a session description protocol (SDP) image attribute that identifies the bitstream.

Clause 31: The method of clause 30, wherein the SDP image attribute includes one or more syntax elements including an image_attribute, a transmission_mode, an item_count, a metadata_index, a store, or a loop.

Clause 32: A device for retrieving media data, the device comprising one or more means for performing the method of any of clauses 1-31.

Clause 33: The device of clause 32, wherein the one or more means comprise one or more processors implemented in circuitry.

Clause 34: The device of clause 32, wherein the device comprises at least one of: an integrated circuit; a microprocessor; or a wireless communication device.

Clause 35: A computer-readable storage medium having stored thereon instructions that, when executed, cause a processor to perform the method of any of clauses 1-31.

Clause 36: A device for receiving media data, the device comprising: means for receiving data for a bitstream indicating that the bitstream includes one or more overlay images; means for receiving the one or more overlay images from the bitstream; means for receiving scene data including one or more scene images; and means for presenting the scene images and the overlay image.

Clause 37: A method of retrieving media data, the method comprising: receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receiving the one or more overlay images from the bitstream; receiving the scene data including one or more scene images; and presenting the scene images and the overlay images.

Clause 38: The method of clause 37, further comprising receiving a session description protocol (SDP) image attribute that identifies the bitstream.

Clause 39: The method of clause 38, wherein the SDP image attribute includes an image attribute indicating a payload type indicating whether the one or more overlay images include the single static image or the image sequence.

Clause 40: The method of clause 39, wherein when the payload type indicates that the one or more images include the single static image, presenting the scene images and the overlay images comprises presenting the single static image repeatedly when presenting the scene images image-by-image.

Clause 41: The method of clause 39, wherein when the payload type indicates that the one or more images include the image sequence, presenting the scene images and the overlay images comprises presenting images of the image sequence in order along with corresponding images of the scene images.

Clause 42: The method of clause 38, wherein the SDP image attribute includes a transmission mode attribute indicating whether the overlay images are continuously retransmitted for as long as the overlay images are to be presented with the frames of the scene data.

Clause 43: The method of clause 38, wherein the SDP image attribute includes data indicating whether the overlay images are to be repeatedly presented in a loop.

Clause 44: The method of clause 43, wherein when the data indicates that the overlay images are to be repeatedly presented in the loop, presenting the scene images and the overlay images comprises: determining that the overlay images include N images in an image sequence, N being a positive integer; and for loop number j, where j is a non-negative integer, presenting image i of the image sequence of the overlay images at time j*N+i, i corresponding to the ith image of the image sequence of the overlay images.

Clause 45: The method of clause 38, wherein the SDP image attribute includes data indicating whether the overlay images are to be stored locally after receipt.

Clause 46: The method of clause 45, wherein when the data indicates that the overlay images are to be stored locally after receipt, the method further comprises storing the overlay images in local memory, and wherein presenting the scene images and the overlay images comprises: retrieving the overlay images from the local memory; and presenting the retrieved overlay images.

Clause 47: The method of clause 45, wherein when the data indicates that the overlay images will be retransmitted, presenting the scene images and the overlay images comprises: receiving retransmitted versions of the overlay images; and presenting the retransmitted versions of the overlay images.

Clause 48: The method of clause 38, wherein the SDP image attribute includes data indicating a number of images included in the overlay images.

Clause 49: The method of clause 37, further comprising receiving data for the bitstream indicating whether the one or more overlay images include one or more image sequences and whether the one or more overlay images include one or more still images.

Clause 50: The method of clause 49, further comprising, when the data indicates that the one or more overlay images include the one or more image sequences, receiving data for the bitstream indicating a number of images in each of the image sequences.

Clause 51: The method of clause 49, further comprising, when the data indicates that the one or more overlay images include the one or more still images, receiving data for the bitstream indicating a number of the still images.

Clause 52: The method of clause 49, further comprising receiving data representing transmission modes for the image sequences and the still images.

Clause 53: The method of clause 52, further comprising, when one of the transmission modes is "coupled," determining display times for the overlay images from timestamp data of the bitstream.

Clause 54: The method of clause 53, wherein the timestamp data comprises Real-time Transport Protocol (RTP) timestamp data.

Clause 55: The method of clause 52, further comprising, when one of the transmission modes is "decoupled": receiving data representing display times for the overlay images separately; and determining the display times for the overlay images from the separately received data.

Clause 56: The method of clause 37, further comprising, when the one or more overlay images include two or more overlay images, receiving data representing a display order of the overlay images.

Clause 57: The method of clause 37, further comprising receiving image metadata for each of the overlay images from the bitstream, the metadata indicating one or more of image dimensions or an image role.

Clause 58: The method of clause 57, wherein the image role comprises at least one of a cover image, a thumbnail image, an auxiliary image, a master image, a hidden image, a pre-computed derived image, a coded image, or a derived image.

Clause 59: The method of clause 57, wherein the metadata includes one or more of an order element indicating an order of presentation of the overlay images or a duration element indicating an amount of time a corresponding one of the overlay images is to be displayed.

Clause 60: A device for retrieving media data, the device comprising: a memory configured to store scene data and image data; and one or more processors implemented in circuitry and configured to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

Clause 61: The device of clause 60, wherein the one or more processors are further configured to receive a session description protocol (SDP) image attribute that identifies the bitstream.

Clause 62: The device of clause 61, wherein the SDP image attribute includes an image attribute indicating a payload type indicating whether the one or more overlay images include the single static image or the image sequence.

Clause 63: The device of clause 62, wherein to present the scene images and the overlay images, the one or more processors are configured to, when the payload type indicates that the one or more images include the single static image, present the single static image repeatedly when presenting the scene images image-by-image.

Clause 64: The device of clause 62, wherein to present the scene images and the overlay images, the one or more processors are configured to, when the payload type indicates that the one or more images include the image sequence, present images of the image sequence in order along with corresponding images of the scene images.

Clause 65: The device of clause 61, wherein the SDP image attribute includes a transmission mode attribute indicating whether the overlay images are continuously retransmitted for as long as the overlay images are to be presented with the frames of the scene data.

Clause 66: The device of clause 61, wherein the SDP image attribute includes data indicating whether the overlay images are to be repeatedly presented in a loop.

Clause 67: The device of clause 66, wherein to present the scene images and the overlay images, the one or more processors are configured to, when the data indicates that the overlay images are to be repeatedly presented in the loop: determine that the overlay images include N images in an image sequence, N being a positive integer; and for loop number j, where j is a non-negative integer, present image i of the image sequence of the overlay images at time j*N+i, i corresponding to the ith image of the image sequence of the overlay images.

Clause 68: The device of clause 61, wherein the SDP image attribute includes data indicating whether the overlay images are to be stored locally after receipt.

Clause 69: The device of clause 68, wherein the one or more processors are further configured to, when the data indicates that the overlay images are to be stored locally after receipt, store the overlay images in the memory, and wherein to present the scene images and the overlay images, the one or more processors are configured to: retrieve the overlay images from the memory; and present the retrieved overlay images.

Clause 70: The device of clause 68, wherein to present the scene images and the overlay images, the one or more processors are configured to, when the data indicates that the overlay images will be retransmitted: receive retransmitted versions of the overlay images; and present the retransmitted versions of the overlay images.

Clause 71: A computer-readable storage medium having stored thereon instructions that, when executed, cause a processor to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

Clause 72: A device for receiving media data, the device comprising: means for receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; means for receiving the one or more overlay images from the bitstream; means for receiving scene data including one or more scene images; and means for presenting the scene images and the overlay image.

Clause 73: A method of retrieving media data, the method comprising: receiving data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receiving the one or more overlay images from the bitstream; receiving the scene data including one or more scene images; and presenting the scene images and the overlay images.

Clause 74: The method of clause 73, further comprising receiving a session description protocol (SDP) image attribute that identifies the bitstream.

Clause 75: The method of clause 74, wherein the SDP image attribute includes an image attribute indicating a payload type indicating whether the one or more overlay images include the single static image or the image sequence.

Clause 76: The method of clause 75, wherein when the payload type indicates that the one or more images include the single static image, presenting the scene images and the overlay images comprises presenting the single static image repeatedly when presenting the scene images image-by-image.

Clause 77: The method of clause 75, wherein when the payload type indicates that the one or more images include the image sequence, presenting the scene images and the overlay images comprises presenting images of the image sequence in order along with corresponding images of the scene images.

Clause 78: The method of any of clauses 74-77, wherein the SDP image attribute includes a transmission mode attribute indicating whether the overlay images are continuously retransmitted for as long as the overlay images are to be presented with the frames of the scene data.

Clause 79: The method of any of clauses 74-78, wherein the SDP image attribute includes data indicating whether the overlay images are to be repeatedly presented in a loop.

Clause 80: The method of clause 79, wherein when the data indicates that the overlay images are to be repeatedly presented in the loop, presenting the scene images and the overlay images comprises: determining that the overlay images include N images in an image sequence, N being a positive integer; and for loop number j, where j is a non-negative integer, presenting image i of the image sequence of the overlay images at time $j*N+i$, i corresponding to the ith image of the image sequence of the overlay images.

Clause 81: The method of any of clauses 74-80, wherein the SDP image attribute includes data indicating whether the overlay images are to be stored locally after receipt.

Clause 82: The method of clause 81, wherein when the data indicates that the overlay images are to be stored locally after receipt, the method further comprises storing the overlay images in local memory, and wherein presenting the scene images and the overlay images comprises: retrieving the overlay images from the local memory; and presenting the retrieved overlay images.

Clause 83: The method of clause 81, wherein when the data indicates that the overlay images will be retransmitted, presenting the scene images and the overlay images comprises: receiving retransmitted versions of the overlay images; and presenting the retransmitted versions of the overlay images.

Clause 84: The method of clause any of clauses 74-83, wherein the SDP image attribute includes data indicating a number of images included in the overlay images.

Clause 85: The method of any of clauses 73-84, further comprising receiving data for the bitstream indicating whether the one or more overlay images include one or more image sequences and whether the one or more overlay images include one or more still images.

Clause 86: The method of clause 85, further comprising, when the data indicates that the one or more overlay images include the one or more image sequences, receiving data for the bitstream indicating a number of images in each of the image sequences.

Clause 87: The method of any of clauses 85 and 86, further comprising, when the data indicates that the one or more overlay images include the one or more still images, receiving data for the bitstream indicating a number of the still images.

Clause 88: The method of any of clauses 85-87, further comprising receiving data representing transmission modes for the image sequences and the still images.

Clause 89: The method of clause 88, further comprising, when one of the transmission modes is "coupled," determining display times for the overlay images from timestamp data of the bitstream.

Clause 90: The method of clause 89, wherein the timestamp data comprises Real-time Transport Protocol (RTP) timestamp data.

Clause 91: The method of clause 88, further comprising, when one of the transmission modes is "decoupled": receiving data representing display times for the overlay images separately; and determining the display times for the overlay images from the separately received data.

Clause 92: The method of any of clauses 73-91, further comprising, when the one or more overlay images include two or more overlay images, receiving data representing a display order of the overlay images.

Clause 93: The method of any of clauses 73-92, further comprising receiving image metadata for each of the overlay images from the bitstream, the metadata indicating one or more of image dimensions or an image role.

Clause 94: The method of clause 93, wherein the image role comprises at least one of a cover image, a thumbnail image, an auxiliary image, a master image, a hidden image, a pre-computed derived image, a coded image, or a derived image.

Clause 95: The method of any of clauses 93 and 94, wherein the metadata includes one or more of an order element indicating an order of presentation of the overlay images or a duration element indicating an amount of time a corresponding one of the overlay images is to be displayed.

Clause 96: A device for retrieving media data, the device comprising: a memory configured to store scene data and image data; and one or more processors implemented in circuitry and configured to: receive data for a bitstream indicating that the bitstream includes one or more overlay images, the overlay images comprising either a single static image to be presented with scene data that remains constant while being presented frame-by-frame with frames of the scene data or an image sequence that repeats with a regular periodicity while being presented frame-by-frame with the frames of the scene data; receive the one or more overlay images from the bitstream; receive the scene data including one or more scene images; and present the scene images and the overlay images.

Clause 97: The device of clause 96, wherein the one or more processors are further configured to receive a session description protocol (SDP) image attribute that identifies the bitstream.

Clause 98: The device of clause 97, wherein the SDP image attribute includes an image attribute indicating a payload type indicating whether the one or more overlay images include the single static image or the image sequence.

Clause 99: The device of clause 98, wherein to present the scene images and the overlay images, the one or more processors are configured to, when the payload type indicates that the one or more images include the single static image, present the single static image repeatedly when presenting the scene images image-by-image.

Clause 100: The device of clause 98, wherein to present the scene images and the overlay images, the one or more processors are configured to, when the payload type indicates that the one or more images include the image sequence, present images of the image sequence in order along with corresponding images of the scene images.

Clause 101: The device of any of clauses 97-100, wherein the SDP image attribute includes a transmission mode attribute indicating whether the overlay images are continuously retransmitted for as long as the overlay images are to be presented with the frames of the scene data.

Clause 102: The device of clause 101, wherein the SDP image attribute includes data indicating whether the overlay images are to be repeatedly presented in a loop.

Clause 103: The device of clause 102, wherein to present the scene images and the overlay images, the one or more processors are configured to, when the data indicates that the overlay images are to be repeatedly presented in the loop: determine that the overlay images include N images in an image sequence, N being a positive integer; and for loop number j, where j is a non-negative integer, present image i of the image sequence of the overlay images at time $j*N+i$, i corresponding to the ith image of the image sequence of the overlay images.

Clause 104: The device of any of clauses 97-103, wherein the SDP image attribute includes data indicating whether the overlay images are to be stored locally after receipt.

Clause 105: The device of clause 104, wherein the one or more processors are further configured to, when the data indicates that the overlay images are to be stored locally after receipt, store the overlay images in the memory, and wherein to present the scene images and the overlay images, the one or more processors are configured to: retrieve the overlay images from the memory; and present the retrieved overlay images.

Clause 106: The device of any of clauses 104 and 105, wherein to present the scene images and the overlay images, the one or more processors are configured to, when the data indicates that the overlay images will be retransmitted: receive retransmitted versions of the overlay images; and present the retransmitted versions of the overlay images.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claim.

What is claimed is:

1. A method of retrieving media data, the method comprising:

receiving, for a Real-time Transport Protocol (RTP) bitstream, session description protocol (SDP) data including an SDP image attribute indicating that the RTP bitstream includes one or more sets of one or more images to be overlaid over scene data of the RTP bitstream, the SDP image attribute including:

a payload type syntax element that corresponds to a set of one or more images of the one or more sets of one or more images to be overlayed over the scene data and carried within the RTP bitstream; and an item count syntax element corresponding to the payload type syntax element, the item count syntax element representing a number of images included in the set of one or more images to be overlayed over the scene data;

receiving the one or more images from the RTP bitstream;

receiving the scene data including one or more frames; and presenting the one or more frames and the one or more images, wherein the one or more images are overlayed over the one or more frames of the scene data.

2. The method of claim 1, wherein the one or more images are received via a High Efficiency Video Coding (HEVC) payload format.

3. The method of claim 2, wherein the one or more frames of scene data are received via the HEVC payload format.

4. The method of claim 1, further comprising storing the one or more images in local memory, and wherein presenting the one or more frames and the one or more images comprises:

retrieving the one or more images from the local memory; and presenting the retrieved one or more images.

5. The method of claim 1, wherein the one or more sets of one or more images include one or more image sequences each associated with a corresponding item count syntax element of the SDP image attribute, and wherein each of the respective item count syntax elements indicates the number of images included in the corresponding one or more image sequences.

6. The method of claim 1, wherein the one or more sets of one or more images include a collection of one or more still images, and wherein the item count syntax element indicates the number of images included in the collection of one or more still images.

7. The method of claim 1, further comprising, when the one or more images include two or more images, receiving data representing a display order of the two or more images.

8. The method of claim 1, further comprising receiving image metadata for each of the one or more images from the RTP bitstream, the metadata indicating one or more of image dimensions associated with the one or more images or an image role associated with the one or more images.

9. The method of claim 8, wherein the metadata includes one or more of an order element indicating an order of presentation of the one or more images or a duration element indicating an amount of time a corresponding one of the one or more images is to be displayed.

10. The method of claim 1, wherein the one or more sets of one or more images includes a collection of still images and an image sequence, and wherein the SDP image attribute includes a first payload type syntax element having a first value corresponding to the collection of still images and a second payload type syntax element having a second value, different than the first value, corresponding to the image sequence.

11. A device for retrieving media data, the device comprising:

a memory configured to store scene data and image data; and one or more processors implemented in circuitry and configured to:

receive, for a Real-time Transport Protocol (RTP) bitstream, session description protocol (SDP) data including an SDP image attribute indicating that the RTP bitstream includes one or more sets of one or more images to be overlayed over scene data of the RTP bitstream, the SDP image attribute including:

a payload type syntax element that corresponds to a set of one or more images of the one or more sets of one or more images to be overlayed over the scene data and carried within the RTP bitstream; and an item count syntax element corresponding to the payload type syntax element, the item count syntax element representing a number of images included in the set of one or more images to be overlayed over the scene data;

receive the one or more images from the RTP bitstream;

receive the scene data including one or more frames; and present the one or more frames and the one or more images, wherein the one or more images are overlayed over the one or more frames of the scene data.

12. The device of claim 11, wherein the one or more processors are further configured to receive the one or more images via a High Efficiency Video Coding (HEVC) payload format.

13. The device of claim 12, wherein the one or more processors are further configured to receive the one or more frames of scene data via the HEVC payload format.

14. The device of claim 11, wherein the one or more processors are further configured to:

store the one or more images in local memory;

retrieve the one or more images from the local memory; and present the retrieved one or more images.

15. The device of claim 11, wherein the one or more sets of one or more images include one or more image sequences each associated with a corresponding item count syntax element of the SDP image attribute, and wherein each of the respective item count syntax elements indicates the number of images included in the corresponding one or more image sequences.

16. The device of claim 11, wherein the one or more sets of one or more images include a collection of one or more still images, and wherein the item count syntax element indicates the number of images included in the collection of one or more still images.

17. The device of claim 11, wherein the one or more processors are further configured to receive image metadata for each of the one or more images from the RTP bitstream, the metadata indicating one or more of image dimensions associated with the one or more images or an image role associated with the one or more images.

18. The device of claim 11, wherein the one or more sets of one or more images includes a collection of still images and an image sequence, and wherein the SDP image attribute includes a first payload type syntax element having a first value corresponding to the collection of still images and a second payload type syntax element having a second value, different than the first value, corresponding to the image sequence.

19. A device for retrieving media data, the device comprising:

a memory configured to store scene data and image data; and one or more processors implemented in circuitry and configured to:

receive, for a Real-time Transport Protocol (RTP) bitstream, session description protocol (SDP) data including an SDP image attribute indicating that the RTP bitstream includes one or more sets of one or more images, the SDP image attribute including:

a payload type syntax element that corresponds to a set of one or more images of the one or more sets of one or more images carried within the RTP bitstream;

receive the one or more images from the RTP bitstream; and present the one or more images.

20. The device of claim 19, wherein the one or more processors are further configured to receive the one or more images via a High Efficiency Video Coding (HEVC) payload format.

21. The device of claim 19, wherein the attribute includes an item count syntax element, the item count syntax element indicating a number of images included in the one or more images.

22. The device of claim 21, wherein the one or more sets of one or more images include one or more image sequences each associated with a corresponding item count syntax element of the SDP image attribute, and wherein each of the respective item count syntax elements indicates the number of images included in the corresponding one or more image sequences.

23. The device of claim 21, wherein the one or more sets of one or more images include a collection of one or more still images, and wherein the item count syntax element indicates the number of images included in the collection of one or more still images.

* * * * *